US007743119B2

(12) United States Patent
Friend et al.

(10) Patent No.: US 7,743,119 B2
(45) Date of Patent: Jun. 22, 2010

(54) SYSTEM AND METHOD FOR MAPPING IDENTIFICATION CODES

(75) Inventors: John Friend, Los Altos, CA (US); Michael Belshe, Sunnyvale, CA (US); David Hoffman, Menlo Park, CA (US)

(73) Assignee: Motorola, Inc., Schaumburg, IL (US)

( * ) Notice: Subject to any disclaimer, the term of this patent is extended or adjusted under 35 U.S.C. 154(b) by 864 days.

(21) Appl. No.: 10/404,976

(22) Filed: Mar. 31, 2003

(65) Prior Publication Data
US 2004/0049599 A1    Mar. 11, 2004

Related U.S. Application Data

(63) Continuation-in-part of application No. 10/109,928, filed on Mar. 29, 2002, now Pat. No. 7,243,163, which is a continuation-in-part of application No. 09/924,283, filed on Aug. 7, 2001, now Pat. No. 7,155,483.

(51) Int. Cl.
G06F 15/16    (2006.01)
(52) U.S. Cl. .................. 709/221; 709/206; 709/248; 709/249; 710/62; 710/63; 710/64; 710/65; 710/74; 455/6
(58) Field of Classification Search ................ 709/206, 709/248, 249; 710/62–74
See application file for complete search history.

(56) References Cited

U.S. PATENT DOCUMENTS

| | | | |
|---|---|---|---|
| 4,682,150 A | 7/1987 | Mathes et al. | |
| 5,049,881 A | 9/1991 | Gibson et al. | |
| 5,115,392 A | 5/1992 | Takamoto et al. | |
| 5,126,739 A | 6/1992 | Whiting et al. | |
| 5,159,592 A | 10/1992 | Perkins | |
| 5,321,840 A | 6/1994 | Ahlin et al. | |
| 5,469,161 A | 11/1995 | Bezek | |
| 5,521,597 A | 5/1996 | Dimitri | |
| 5,553,281 A | 9/1996 | Brown et al. | |
| 5,559,800 A | 9/1996 | Mousseau et al. | |
| 5,563,595 A | 10/1996 | Strohacker | |
| 5,666,530 A * | 9/1997 | Clark et al. ................. 707/201 |
| 5,715,387 A | 2/1998 | Barnstijn et al. | |

(Continued)

FOREIGN PATENT DOCUMENTS

EP    0666651    8/1995

(Continued)

OTHER PUBLICATIONS

Hild, et al., "Mobilizing Applications", *IEEE Personal Communications*, XP-000721303,(Oct. 1997),26-34.

(Continued)

*Primary Examiner*—Thu Nguyen
*Assistant Examiner*—Tauqir Hussain
(74) *Attorney, Agent, or Firm*—Blakely Sokoloff Taylor & Zafman, LLP

(57) ABSTRACT

According to one embodiment, a system is disclosed. The system includes a wireless data processing device and a server communicatively coupled to the wireless device. The server comprises mapping logic that translates data objects having a first set of identification (ID) codes to a second set of ID codes for transmission to the wireless device to maintain synchronization of data objects with the wireless device over a wireless network.

20 Claims, 3 Drawing Sheets

U.S. PATENT DOCUMENTS

| | | | |
|---|---|---|---|
| 5,727,159 A | 3/1998 | Kikinis | |
| 5,727,202 A | 3/1998 | Kucala | |
| 5,760,716 A | 6/1998 | Mathews et al. | |
| 5,771,010 A * | 6/1998 | Masenas | 341/51 |
| 5,790,974 A | 8/1998 | Tognazzini | |
| 5,793,970 A * | 8/1998 | Fakes et al. | 709/216 |
| 5,802,312 A * | 9/1998 | Lazaridis et al. | 709/238 |
| 5,841,376 A | 11/1998 | Hayashi | |
| 5,870,610 A | 2/1999 | Beyda | |
| 5,875,329 A | 2/1999 | Shan | |
| 5,903,230 A | 5/1999 | Masenas | |
| 5,930,471 A | 7/1999 | Milewski et al. | |
| 5,961,590 A | 10/1999 | Mendez et al. | |
| 5,974,238 A | 10/1999 | Chase, Jr. | |
| 5,987,464 A | 11/1999 | Schneider | |
| 6,003,089 A | 12/1999 | Shaffer et al. | |
| 6,023,708 A | 2/2000 | Mendez et al. | |
| 6,034,621 A | 3/2000 | Kaufman | |
| 6,052,735 A * | 4/2000 | Ulrich et al. | 709/236 |
| 6,065,017 A | 5/2000 | Barker | |
| 6,085,185 A | 7/2000 | Matsuzawa et al. | |
| 6,104,392 A | 8/2000 | Shaw et al. | |
| 6,111,707 A | 8/2000 | Buddecke et al. | |
| 6,151,606 A | 11/2000 | Mendez | |
| 6,182,117 B1 | 1/2001 | Christie et al. | |
| 6,188,695 B1 | 2/2001 | Przybysz | |
| 6,216,157 B1 | 4/2001 | Vishwanath et al. | |
| 6,218,970 B1 | 4/2001 | Jaquette | |
| 6,219,694 B1 | 4/2001 | Lazaridis et al. | |
| 6,226,618 B1 | 5/2001 | Downs | |
| 6,259,891 B1 | 7/2001 | Allen | |
| 6,275,848 B1 | 8/2001 | Arnold | |
| 6,279,001 B1 | 8/2001 | DeBettencourt et al. | |
| 6,304,881 B1 | 10/2001 | Halim et al. | |
| 6,310,889 B1 | 10/2001 | Parsons et al. | |
| 6,330,618 B1 | 12/2001 | Hawkins et al. | |
| 6,343,299 B1 * | 1/2002 | Huang et al. | 707/203 |
| 6,347,340 B1 | 2/2002 | Coelho et al. | |
| 6,360,272 B1 | 3/2002 | Lincke et al. | |
| 6,384,850 B1 | 5/2002 | McNally et al. | |
| 6,393,434 B1 | 5/2002 | Huang et al. | |
| 6,396,482 B1 | 5/2002 | Griffin et al. | |
| 6,401,136 B1 | 6/2002 | Britton et al. | |
| 6,430,601 B1 | 8/2002 | Eldridge et al. | |
| 6,449,622 B1 | 9/2002 | LaRue et al. | |
| 6,457,062 B1 * | 9/2002 | Pivowar et al. | 709/248 |
| 6,460,055 B1 | 10/2002 | Midgley et al. | |
| 6,463,463 B1 | 10/2002 | Godfrey et al. | |
| 6,463,464 B1 | 10/2002 | Lazaridis et al. | |
| 6,477,543 B1 * | 11/2002 | Huang et al. | 707/200 |
| 6,505,055 B1 | 1/2003 | Kahn et al. | |
| 6,535,892 B1 | 3/2003 | LaRue et al. | |
| 6,571,245 B2 | 5/2003 | Huang et al. | |
| 6,604,236 B1 | 8/2003 | Draper et al. | |
| 6,615,253 B1 | 9/2003 | Bowman-Amuah | |
| 6,625,621 B2 | 9/2003 | Tan et al. | |
| 6,636,873 B1 | 10/2003 | Carini et al. | |
| 6,640,244 B1 | 10/2003 | Bowman-Amuah | |
| 6,654,746 B1 | 11/2003 | Wong et al. | |
| 6,658,167 B1 | 12/2003 | Lee et al. | |
| 6,671,757 B1 * | 12/2003 | Multer et al. | 710/100 |
| 6,675,203 B1 | 1/2004 | Herrod et al. | |
| 6,694,335 B1 | 2/2004 | Hopmann et al. | |
| 6,697,458 B1 | 2/2004 | Kunjibettu | |
| 6,701,378 B1 | 3/2004 | Gilhuly et al. | |
| 6,721,787 B1 | 4/2004 | Hiscock | |
| 6,721,871 B2 | 4/2004 | Piispanen et al. | |
| 6,757,698 B2 | 6/2004 | McBride et al. | |
| 6,779,019 B1 | 8/2004 | Mousseau et al. | |
| 6,792,085 B1 | 9/2004 | Rigaldies et al. | |
| 6,810,405 B1 * | 10/2004 | LaRue et al. | 707/201 |
| 6,874,029 B2 | 3/2005 | Hutcheson et al. | |
| 6,874,037 B1 | 3/2005 | Abram et al. | |
| 6,901,415 B2 | 5/2005 | Thomas et al. | |
| 6,931,454 B2 | 8/2005 | Deshpande et al. | |
| 6,934,766 B1 | 8/2005 | Russell | |
| 6,941,348 B2 | 9/2005 | Petry et al. | |
| 6,941,349 B2 | 9/2005 | Godfrey et al. | |
| 6,954,789 B2 | 10/2005 | Dietz et al. | |
| 6,973,299 B2 | 12/2005 | Apfel | |
| 6,983,308 B1 | 1/2006 | Oberhaus | |
| 7,003,776 B2 | 2/2006 | Sutherland | |
| 7,085,809 B2 | 8/2006 | Mori et al. | |
| 7,092,699 B1 | 8/2006 | Hefter | |
| 7,136,934 B2 | 11/2006 | Carter et al. | |
| 7,139,555 B2 | 11/2006 | Apfel | |
| 7,149,813 B2 | 12/2006 | Flanagin et al. | |
| 7,155,483 B1 | 12/2006 | Friend et al. | |
| 2001/0004744 A1 * | 6/2001 | Lazaridis et al. | 709/206 |
| 2001/0005864 A1 | 6/2001 | Mousseau et al. | |
| 2001/0010059 A1 | 7/2001 | Burman et al. | |
| 2001/0034654 A1 | 10/2001 | L. Vigil et al. | |
| 2002/0013853 A1 | 1/2002 | Baber et al. | |
| 2002/0016818 A1 | 2/2002 | Kirani et al. | |
| 2002/0019225 A1 | 2/2002 | Miyashita | |
| 2002/0032722 A1 | 3/2002 | Baynes et al. | |
| 2002/0046286 A1 * | 4/2002 | Caldwell et al. | 709/229 |
| 2002/0119793 A1 | 8/2002 | Hronek et al. | |
| 2002/0120696 A1 | 8/2002 | Mousseau et al. | |
| 2002/0146240 A1 * | 10/2002 | Ogawa et al. | 386/109 |
| 2002/0160773 A1 | 10/2002 | Gresham et al. | |
| 2003/0046434 A1 | 3/2003 | Flanagin et al. | |
| 2003/0050046 A1 | 3/2003 | Conneely et al. | |
| 2003/0069842 A1 | 4/2003 | Kight et al. | |
| 2003/0081621 A1 | 5/2003 | Godfrey et al. | |
| 2003/0097381 A1 | 5/2003 | Detweiler | |
| 2004/0054739 A1 | 3/2004 | Friend et al. | |
| 2004/0105423 A1 * | 6/2004 | Koehler et al. | 370/351 |
| 2004/0109436 A1 | 6/2004 | Vargas et al. | |
| 2005/0148356 A1 | 7/2005 | Ferguson et al. | |

FOREIGN PATENT DOCUMENTS

| | | |
|---|---|---|
| EP | 0909037 | 4/1999 |
| EP | 0917077 | 5/1999 |
| EP | 1014629 | 6/2000 |
| EP | 03719504 | 8/2006 |
| WO | WO00/67158 | 11/2000 |
| WO | WO-01/78342 | 10/2001 |
| WO | WO02/19626 | 3/2002 |

OTHER PUBLICATIONS

Patent Cooperation Treaty, "International Search Report" for International Application No. PCT/US2003/012799; Jul. 28, 2003; 1 page.

Patent Cooperation Treaty, "International Search Report" for International Application No. PCT/US2002/021596; Oct. 24, 2002; 3 pages.

Patent Cooperation Treaty, "International Search Report" for International Application No. PCT/US2002/021548; Nov. 25, 2002; 3 pages.

Patent Cooperation Treaty; "International Search Report" for International Application No. PCT/US2003/009576; Jun. 20, 2003; 3 pages.

* cited by examiner

SYSTEM AND METHOD FOR MAPPING IDENTIFICATION CODES

PRIORITY

This application is a continuation-in-part of co-pending U.S. application entitled SYSTEM AND METHOD FOR FULL WIRELESS SYNCHRONIZATION OF A DATA PROCESSING APPARATUS WITH A DATA SERVICE, application Ser. No. 10/109,928, filed Mar. 29, 2002, which is a continuation-in-part of co-pending U.S. application entitled APPARATUS AND METHOD FOR CONSERVING BANDWIDTH BY BATCH PROCESSING DATA TRANSACTIONS, application Ser. No. 09/924,283, filed Aug. 7, 2001.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

This invention relates generally to the field of network data services. More particularly, the invention relates to an apparatus and method for synchronizing a wireless data processing device with a wireless messaging service.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM").™

Personal digital assistants such as the Palm devices typically provide only limited wireless messaging capabilities (e.g., instant messaging and basic Internet access). For example, these devices typically require a user to manually establish a connection to the Internet via an Internet Service Provider ("ISP") or to a corporate server to check e-mail messages.

Although corporate messaging systems such as the RIM Blackberry provide more comprehensive messaging capabilities, there are significant limitations to these systems. Specifically, these systems employ e-mail "redirection" or "forwarding" techniques in which messages are redirected to the wireless device only if certain conditions are met. These conditions, referred to as "redirection events," may include, for example, an indication that the user is not working at his corporate desktop (e.g., removal of the wireless device from the desktop cradle, a screen saver firing on the desktop, . . . etc) or a manual redirection command initiated by the user (e.g., via the wireless device or the corporate desktop). One such message redirection system is described in U.S. Pat. No. 6,219,694 ("System and Method for Pushing Information From a Host System to a Mobile Data Communication Device Having a Shared Electronic Address").

As a result, these systems are (as a practical matter) incapable of providing complete synchronization between the wireless device and the corporate e-mail database. For example, because messages are only redirected to the wireless device under certain conditions (e.g., following a redirection event), at any given point in time, the wireless device may contain an incomplete set of e-mail data. Moreover, even when messages are actively being forwarded to the wireless device, the e-mail data stored at the wireless device and the e-mail database are not truly synchronized. For example, certain types of transactions performed on the wireless device, such as an indication that a message has been viewed by the user, message deletions, movement of messages from one folder to another, . . . etc., are not updated at the e-mail service wirelessly.

Moreover, only basic e-mail functions such as sending and receiving messages may be controlled at the wireless device. More advanced e-mail management functions must be set at the user's desktop (e.g., configuring e-mail filters, outgoing e-mail signatures, security settings such as passwords, . . . etc).

In addition, prior messaging systems require a corporate desktop to which the device must be attached when the user is in the office. The problem with this is not merely that a corporate desktop is required, but also that the corporate desktop must be configured with software and a proprietary "cradle" that allows it to communicate directly to the wireless device.

Accordingly, what is needed is a system and method for providing complete synchronization and management between a wireless device and a messaging service (e.g., a corporate e-mail account). What is also needed is a wireless apparatus for receiving and sending e-mail messages, which does not require a corporate desktop or any software to be installed and executed on the corporate desktop.

SUMMARY

According to one embodiment, a system is disclosed. The system includes a wireless data processing device and a server communicatively coupled to the wireless device. The server comprises mapping logic that translates data objects having a first set of identification (ID) codes to a second set of ID codes for transmission to the wireless device to maintain synchronization of data objects with the wireless device over a wireless network.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An Exemplary Network Architecture

Figure 1:
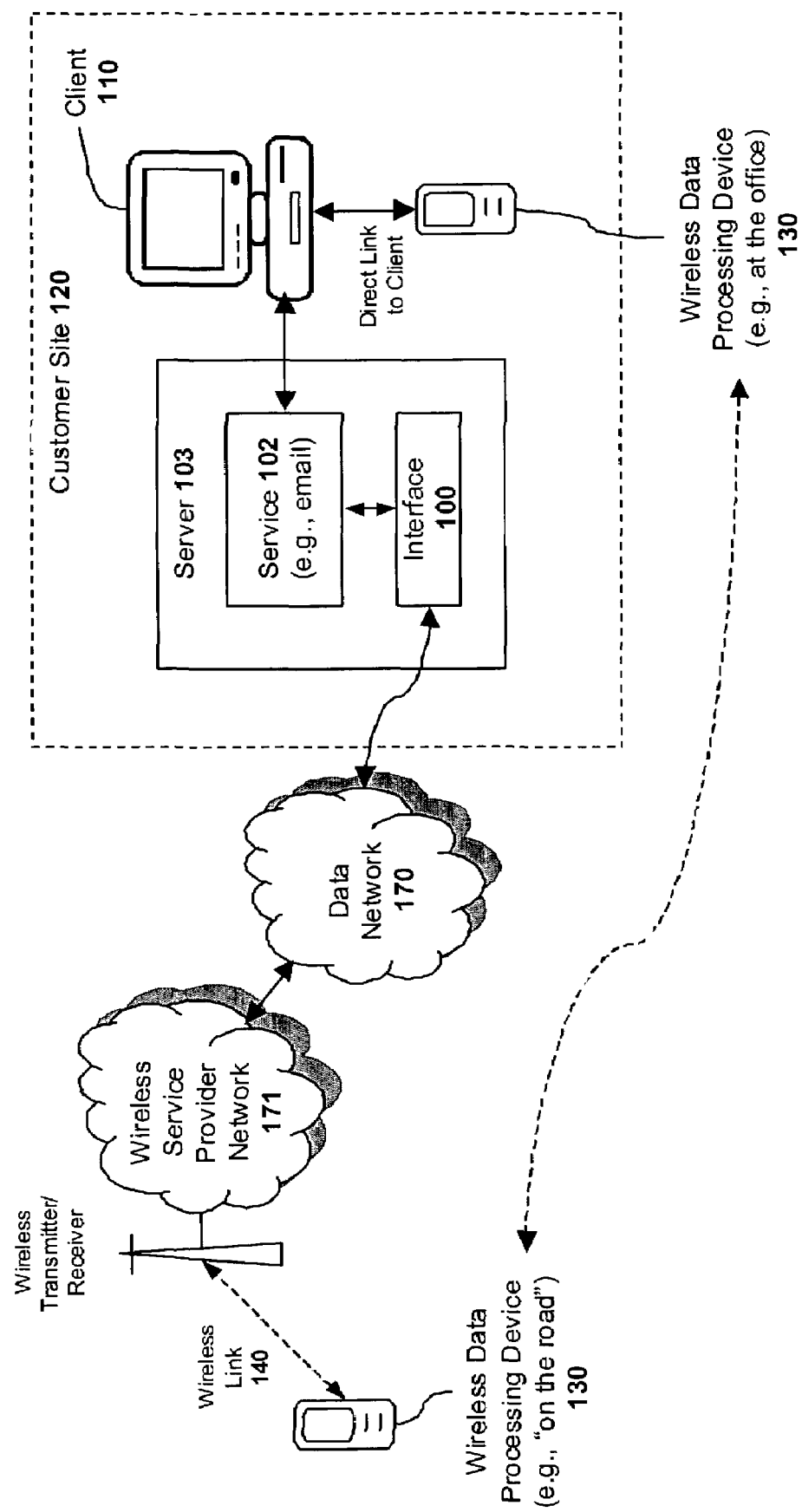
FIG. 1 illustrates an exemplary network architecture used to implement elements of the present invention.

FIG. 1 illustrates one embodiment of a network architecture. A "customer site" 120 illustrated in FIG. 1 may be any local-area or wide-area network over which a plurality of servers 103 and clients 110 communicate. For example, customer site 120 may include all servers and clients maintained by a single corporation.

Servers 103 may be configured to provide a variety of different messaging and groupware services 102 to network users (e.g., e-mail, instant messaging, calendaring, . . . etc). In one embodiment, these services are provided by Microsoft Exchange.™ However, the underlying principles of the invention are not limited to any particular messaging/groupware platform.

In one embodiment, an interface 100 forwards data objects maintained by service 102 (e.g., e-mail messages, instant messages, calendar data, . . . etc) to a plurality of wireless data processing devices (represented in FIG. 1 by wireless device 130) via an external data network 170 and/or a wireless service provider network 171. For example, if the service 102 includes an e-mail database, the interface 100 transmits any new e-mails, which arrive in a user's mailbox on the service 102 to the user's wireless data processing device 130 (over the network(s) 170 and/or 171).

Alternatively, or in addition, the service 102 may provide the e-mail to the user's local computer (e.g., client 110) upon request (i.e., so that the user will receive the e-mail on his/her wireless device 130 when out of the office and on his/her personal computer 110 when in the office). Conversely, e-mail messages sent from the user's wireless data processing device 130 are transmitted to the service 102 via the interface 100.

In one embodiment, the interface 100 is a software module adapted to work with the particular service 120. It should be noted, however, that interface 100 may be implemented in hardware or any combination of hardware and software while still complying with the underlying principles of the invention.

In one embodiment, the external data network 170 is comprised of a plurality of databases, servers/clients (not shown) and other networking hardware (e.g., routers, hubs, . . . etc) for transmitting data between the interface 100 and the wireless devices 130. In one embodiment, the interface 100 encapsulates data in one or more packets containing an address identifying the wireless devices 130 (e.g., such as a 24-bit Mobitex Access Number ("MAN #")).

The external data network 170 transmits the packets to a wireless service provider network 171, which in turn, transmits the packets (or the data contained therein) over a wireless communication link to the wireless device 130. In one embodiment, the wireless service provider network is a 2-way paging network. However, various other network types may be employed (e.g., CDMA 2000, GPRS, PCS, . . . etc) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

In one embodiment, service 102 (e.g., the e-mail database) is fully synchronized with wireless data processing device 130. Thus, any actions performed on wireless device 130 are automatically updated on service 102 and any transactions occurring at service 102 are automatically reflected on device 130.

In a further embodiment, synchronization updates of this type may include, but are not limited to, device configuration modifications, calendar updates, e-mail message updates, instant messages, to-do list updates and/or any other type of personal information management transactions or corporate data management transactions (hereinafter "message transactions").

As one example, when a user views an e-mail message using device 130, a message transaction indicating that the user viewed the message is transmitted to service 102 (via the interface 100). Accordingly, if the user subsequently connects to e-mail via a client 110, the e-mail will appear as having already been viewed.

Other actions such as message deletions, filing activities (e.g., moving a message to a particular folder), message responses, meeting confirmations/additions . . . etc, will automatically be reflected in the service 102, thereby providing complete synchronization between the service 102, the device 130 and/or the client 110 (if one is being used).

Current messaging systems do not offer complete wireless device synchronization. As such, these systems require that the user have a desktop computer with a "cradle" to which the device is attached to receive certain types of synchronization updates. One reason for this is that prior systems process message transactions in a relatively inefficient manner and employ only limited compression techniques, thereby making complete synchronization impractical. As such, in order to realize complete wireless synchronization, embodiments of the invention employ one or more of the following compression and/or message processing techniques.

Identification Code Allocation

According to one embodiment, each e-mail message, calendar entry, to-do list entry, . . . etc, is assigned a unique identification code by service 102. For example, if the service is Microsoft Exchange, a 128-byte identification code is generated for each new data object. Accordingly, when fully synchronizing a wireless device 130 to the service 102, a mechanism is to be provided to ensure that no duplicate identification codes are assigned for two distinct data objects. For example, if both the service 102 and the wireless device 130 are capable of independently generating data objects, they may both concurrently generate data objects with the same identification codes, resulting in a conflict.

One mechanism for solving this problem is to require the wireless device 130 to request a new identification code from the service 102 each time it generates a new data object. One potential problem with this scenario is that it may take an unreasonably long time for the wireless device 130 to acquire the identification code from service 102 via data network 170, depending on the speed of the wireless network. For instance, several seconds may be considered an unreasonable amount of time to wait to begin entering a new e-mail message or calendar entry.

Alternatively, in one embodiment, the range of all possible data object codes is divided between the wireless device 130 and the service 103. In other words, a certain percentage (e.g., ½) of all possible codes are allocated to the wireless device 130 and the remaining possible codes are allocated to the service 103. In operation, when a new data object is generated at the wireless device (e.g., a new "to-do" list entry) the wireless device 130 will select a data object code only from within its pre-assigned range, thereby preventing a conflict at the service 102.

In one embodiment, all negative codes are assigned to the wireless device 130 and all positive codes are assigned to the service 102. If a 32-bit (4-byte) code is used, this will result in 2,147,483,648 ($2^{31}$) negative codes and 2,147,483,648 ($2^{31}$) positive codes. It should be noted, however, that the particular manner in which codes are divided up is not pertinent to the underlying principles of the invention.

Identification Code Translation

Another potential problem which exists when fully synchronizing a wireless device with a service is that the standard data object identification codes employed by many services are unnecessarily large. As mentioned above, Microsoft Exchange generates a 128-byte (1024 bit) code to identify each unique data object.

Figure 2:
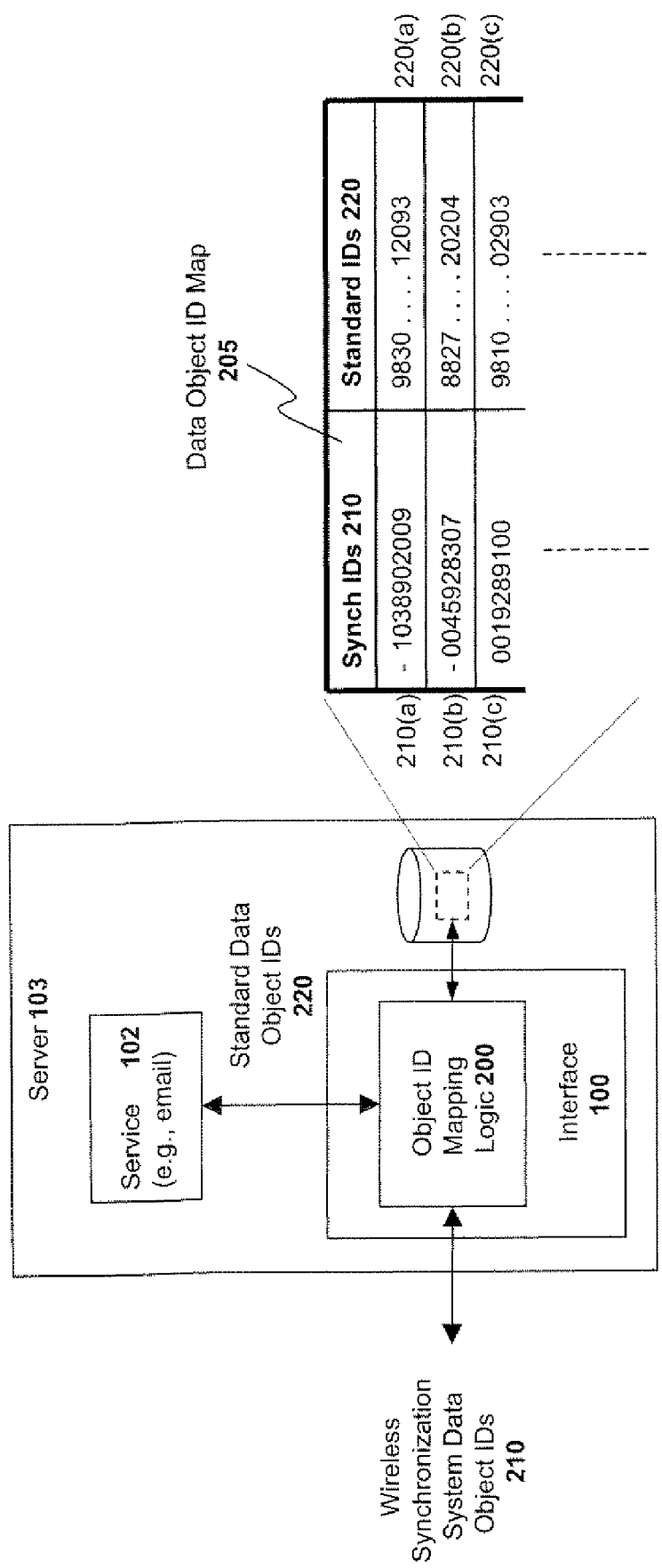
FIG. 2 illustrates one embodiment of a mechanism that maps synchronization identification codes to standard identification codes.

Accordingly, in one embodiment of the invention illustrated in FIG. 2, interface 100 includes object identification code mapping logic 200 for mapping standard data object identification codes 220 (e.g., such as the 128-byte codes used by Microsoft Exchange) to data object identification codes 210 generated specifically for use in the synchronization system described herein (hereinafter "synchronization system identification codes").

As illustrated, object identification code mapping logic 200 maintains a data object identification table 205 in which each standard identification code 220 is associated with a corresponding synchronization system identification code 210. As shown in FIG. 2, a first data object has a first synchronization ID 210(*a*) associated with a first standard ID 220(*a*). Similarly, a second data object has a second synchronization ID 210(*a*) associated with a second standard ID 220(*a*), etc. As described above, in one embodiment, the synchronization system identification codes 210 are 32-bits in length, thereby significantly reducing the amount of information transmitted across the wireless network. In addition, as indicated in FIG. 2, negative identification codes 210 identify data objects created by the wireless device 130 and positive identification codes 210 identify data objects created at service 102 (e.g., from a local desktop PC).

Exemplary Computer System

Figure 3:
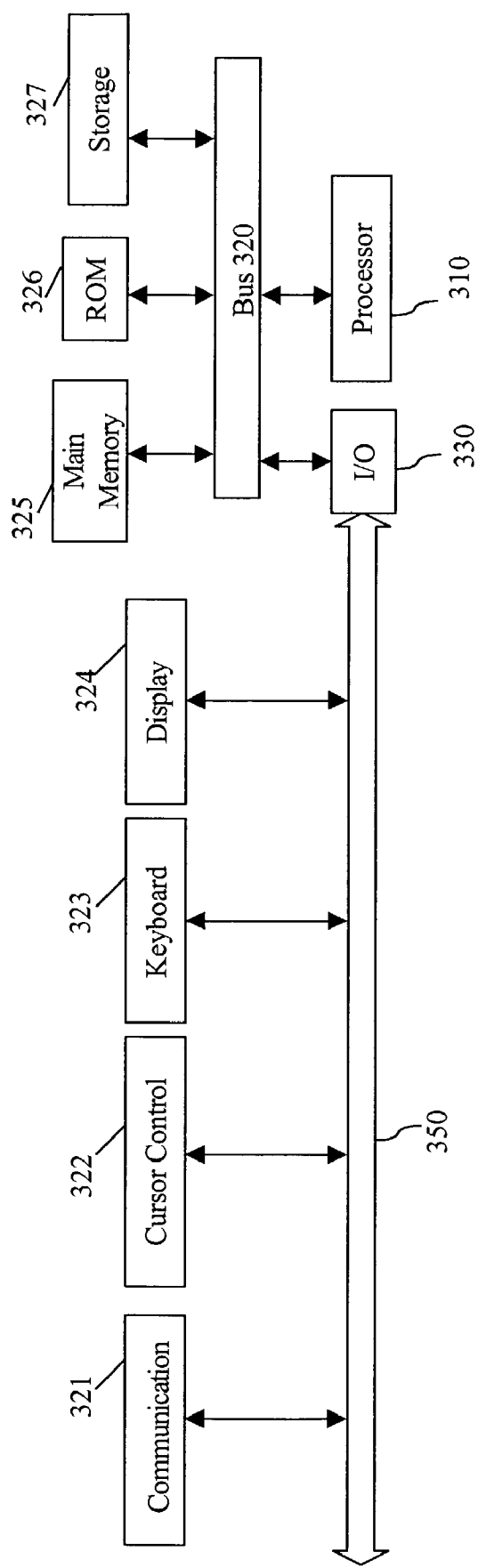
FIG. 3 illustrates one embodiment of a computer system.

FIG. 3 illustrates a computer system 300 on which wireless device 130 and or server 103 may be implemented. Computer system 300 includes a system bus 320 for communicating information, and a processor 310 coupled to bus 320 for processing information. According to one embodiment, processor 310 is implemented using one of the multitudes of Motorola DragonBall MC68328-family of microprocessors. Nevertheless one of ordinary skill in the art will appreciate that other processors may be used.

Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310.

A data storage device 325 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 324, an input device (e.g., an alphanumeric input device 323 and/or a cursor control device 322).

The communication device 321 is for accessing other computers (servers or clients) via network 170. The communication device 321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 100 to a service 102 executed on a server 103 (see FIG. 1), it will be appreciated that the underlying principles of the invention may be implemented on a single client in which the client transmits data over a network.

Moreover, although described in the context of a wireless data processing device, the underlying principles of the invention may be implemented to compress data in virtually any networking environment, both wired and wireless. Accordingly, the scope and spirit of the invention should be judged in terms of the claims which follow.

What is claimed is:

1. A system comprising:
   a wireless data processing device;
   a wireless network communicatively coupled to the wireless device; and
   a server, communicatively coupled to the wireless network, including:
   a service to maintain data objects on behalf of a user; and
   an interface having:

synchronization logic to initiate first synchronization with the wireless device by automatically transmitting a first message update to the wireless device upon receiving a modification to a first data object from the service having a first standard ID and to initiate second synchronization with the wireless device by automatically transmitting a second message update to the wireless device upon receiving a modification to a second data object from the service having a second standard ID, wherein the first standard ID and the second standard ID have a first data length; and mapping logic to translate the first standard ID to a first synch ID having a data second length and the second standard ID to a second synch ID having the second data length prior to the transmission of the message updates to the wireless device.

2. The system of claim 1 wherein the mapping logic translates data objects received from the wireless device having the first synch ID to the first standard ID.

3. The system of claim 2 further comprising a database, coupled to the mapping logic, having an object ID table to associate the first and second standard IDs with a corresponding ID in the first and second synch IDs.

4. The system of claim 1 wherein the server has a first synchronization ID code range and the wireless device has a second synchronization ID code range.

5. The system of claim 4 wherein a new data object generated at the server is assigned a synchronization ID code from within the first code range.

6. The system of claim 5 wherein a new data object generated at the wireless device is assigned a synchronization ID code from within the second code range.

7. The system of claim 5 wherein negative synchronization ID codes are assigned to the wireless device and positive synchronization ID codes are assigned to the messaging service application.

8. The system of claim 5 wherein negative synchronization ID codes are assigned to the messaging service application and positive synchronization ID codes are assigned to the wireless device.

9. The system of claim 3 wherein the first and second standard IDs comprise a 128-byte standard ID and the first and second synch IDs 4-byte synchronization ID codes.

10. A method comprising:
automatically generating a first message update indicating a modification to a first data object including a first standard ID code from an electronic mail service;
translating the first standard ID code having a first data length to a first synchronization ID code having a second data length;
initiating first synchronization with a wireless device by transmitting the first message update to the wireless device over a wireless network using the first synchronization ID code;
automatically generating a second message update indicating a modification to a second data object including a second standard ID code from the electronic mail service;
translating the second standard ID code having the first data length to a second synchronization ID code having the second data length; and
initiating second synchronization with the wireless device by transmitting the second message update to the wireless device using the second synchronization ID code.

11. The method of claim 10 further comprising:
receiving a third message update from the wireless device indicating a modification to a third data object including a third synchronization ID code; and
translating the third synchronization ID code to a third object ID code.

12. A server comprising:
an interface, communicatively coupled to a wireless device, including
synchronization logic to initiate first synchronization with the wireless device by automatically transmitting a first message update to the wireless device upon receiving a modification to a first data object from a data object maintenance service having a first standard ID and to initiate second synchronization with the wireless device by automatically transmitting a second message update to the wireless device upon receiving a modification to a second data object from the service having a second standard ID, wherein the first standard ID and the second standard ID have a first data length; and mapping logic to translate the first standard ID to a first synch ID having a second data length and the second standard ID to a second synch ID having the second data length prior to the transmission of the message updates to the wireless device.

13. The server of claim 12 wherein the mapping logic translates data objects received from the wireless device having the first synch ID to the first standard ID.

14. The server of claim 13 further comprising a database, coupled to the mapping logic, having an object ID table to associate the first and second standard IDs with a corresponding ID in the first and second synch IDs.

15. The server of claim 12 wherein a range of synchronization ID codes generated at the server and the wireless device are divided in a manner that the server has a first code range and the wireless device has a second code range.

16. The server of claim 15 wherein a new data object generated at the server is assigned a synchronization ID code from within the first code range.

17. The server of claim 16 wherein a new data object generated at the wireless device is assigned a synchronization ID code from within the second code range.

18. The server of claim 16 wherein negative synchronization ID codes are assigned to the wireless device and positive synchronization ID codes are assigned to the messaging service application.

19. The server of claim 16 wherein negative synchronization ID codes are assigned to the messaging service application and positive synchronization ID codes are assigned to the wireless device.

20. The server of claim 14 wherein the first and second standard IDs comprise a 128-byte standard ID and the first and second synch IDs 4-byte synchronization ID codes.

* * * * *